US010549359B2

(12) United States Patent
Hayasaka et al.

(10) Patent No.: US 10,549,359 B2
(45) Date of Patent: Feb. 4, 2020

(54) END MILL MACHINING APPARATUS, CAM APPARATUS, NC PROGRAM, AND MACHINING METHOD

(71) Applicant: NATIONAL UNIVERSITY CORPORATION NAGOYA UNIVERSITY, Nagoya-shi, Aichi-ken (JP)

(72) Inventors: Takehiro Hayasaka, Nagoya (JP); Shunsuke Fujimaki, Nagoya (JP); Eiji Shamoto, Nagoya (JP)

(73) Assignee: NATIONAL UNIVERSITY CORPORATION NAGOYA UNIVERSITY, Nagoya-shi (JP)

( * ) Notice: Subject to any disclaimer, the term of this patent is extended or adjusted under 35 U.S.C. 154(b) by 0 days.

(21) Appl. No.: 16/083,113

(22) PCT Filed: Feb. 28, 2017

(86) PCT No.: PCT/JP2017/007811
§ 371 (c)(1),
(2) Date: Sep. 7, 2018

(87) PCT Pub. No.: WO2017/154671
PCT Pub. Date: Sep. 14, 2017

(65) Prior Publication Data
US 2019/0091778 A1 Mar. 28, 2019

(30) Foreign Application Priority Data
Mar. 11, 2016 (JP) .................... 2016-048792

(51) Int. Cl.
*B23Q 15/12* (2006.01)
*B23C 5/10* (2006.01)
*G05B 19/4155* (2006.01)

(52) U.S. Cl.
CPC ............... *B23C 5/10* (2013.01); *B23Q 15/12* (2013.01); *G05B 19/4155* (2013.01); *G05B 2219/37355* (2013.01)

(58) Field of Classification Search
CPC .......... B23C 2220/00; B23C 2220/48; B23C 2255/08; B23Q 15/12; G05B 19/4155; G05B 2219/37355; G05B 2219/37358
See application file for complete search history.

(56) References Cited

U.S. PATENT DOCUMENTS

2003/0170085 A1   9/2003  Kakino et al.
2013/0309034 A1  11/2013  Inagaki et al.
(Continued)

FOREIGN PATENT DOCUMENTS

JP   2000-000714 A   1/2000
JP   2003-263208 A   9/2003
(Continued)

OTHER PUBLICATIONS

May 23, 2017 International Search Report issued in International Patent Application No. PCT/JP2017/007811.
(Continued)

*Primary Examiner* — Alan Snyder
(74) *Attorney, Agent, or Firm* — Oliff PLC (57) ABSTRACT

An end mill machining apparatus, a CAM apparatus, an NC program, and a machining method which suppress regenerative self-excited vibration and mode-coupling self-excited vibration. An end mill machining apparatus includes an end mill, and a control section for controlling the end mill. The ratio of the protrusion length of the end mill to the diameter of the end mill falls within a range of 5 to 50. The end mill is a variable pitch, uniform helix type or a variable helix type. The control section controls the end mill such that the contact angle between the end mill and a workpiece M1
(Continued)

during machining becomes equal to or smaller than a critical contact angle $\theta_{lim}$.

17 Claims, 8 Drawing Sheets

(56) References Cited

U.S. PATENT DOCUMENTS

| 2013/0338809 | A1* | 12/2013 | Kume | G05B 19/4155 |
| | | | | 700/97 |
| 2015/0127139 | A1* | 5/2015 | Bolin | G05B 19/4065 |
| | | | | 700/173 |
| 2016/0368068 | A1 | 12/2016 | Shamoto | |

FOREIGN PATENT DOCUMENTS

| JP | 2010-260120 A | 11/2010 |
| JP | 2013-240837 A | 12/2013 |
| JP | 2016-155215 A | 9/2016 |
| WO | 2015/001789 A1 | 1/2015 |

OTHER PUBLICATIONS

Oct. 17, 2017 International Preliminary Report on Patentability issued in International Patent Application No. PCT/JP2017/007811.

\* cited by examiner

END MILL MACHINING APPARATUS, CAM APPARATUS, NC PROGRAM, AND MACHINING METHOD

TECHNICAL FIELD

The technique of the present specification relates to an end mill machining apparatus, a CAM apparatus, an NC program, and a machining method. More specifically, the technique relates to an end mill machining apparatus, a CAM apparatus, NC program, and a machining method which suppress vibrations during machining.

BACKGROUND ART

Cutting is frequently used in processes of manufacturing industrial products. For example, cutting is used for direct machining of products and machining of dies. When such cutting is performed, chatter vibrations may be generated on a tool. Chatter vibrations cause a deterioration in the shape of a finished surface or breakage of the tool.

Chatter vibrations include two types of vibrations; i.e., forced vibration and self-excited vibration. Forced vibration is a vibration which is generated when some forced causal vibration is amplified by the vibration characteristic of a machine. For example, intermittent cutting force generated during end milling or the like causes forced vibration. However, in some cases, the term "chatter vibration" does not encompass forced vibration. Self-excited vibration is a vibration which is generated when a vibration generated in a cutting process grows (i.e., is amplified) because of a presence of a closed loop that feeds back the generated vibration.

Major types of self-excited vibration include a regenerative type self-excited vibration and a mode-coupling type self-excited vibration. Regenerative self-excited vibration is generated, for example, when a vibration generated during cutting in a previous rotation or cutting by a preceding tooth has remained as an undulation of the machined surface, the uncut chip thickness fluctuates in time due to the remaining shape and a vibration at the present point. Mode-coupling self-excited vibration is generated, for example, when vibration modes in two directions have resonance frequencies close to each other and the vibrations in the two directions are coupled. Such chatter vibrations are collectively shown in the following Table 1.
[Table 1]
  (a) forced vibration
  (b) self-excited vibration
  (b-1) regenerative self-excited vibration
  (b-2) mode-coupling self-excited vibration Therefore, techniques for suppressing chatter vibrations have been developed. For example, Patent Document 1 discloses an unequally divided end mill which has an odd number of cutting teeth and in which dividing angles different from one another are provided for the cutting teeth.

PRIOR ART DOCUMENT

Patent Document

Patent Document 1

Japanese Patent Application Laid-Open (kokai) No. 2000-714

SUMMARY OF THE INVENTION

Problem to be Solved by the Invention

In this end mill, the phase of the "regenerative effect" remaining on a machined surface and changing the uncut chip thickness at the present point in time is not fixed. Therefore, regenerative self-excited vibration can be suppressed. However, the end mill disclosed in Patent Document 1 encounters difficulty in suppressing mode-coupling self-excited vibration.

In recent years, in manufacture of dies, there has been an increasing need to form a groove that has a large depth as compared with the width of the groove. Formation of such a deep groove requires an end mill which is large in the ratio of its protrusion length to its outer diameter; i.e., a thin, long end mill. When such a thin, long end mill is used, self-excited vibration becomes more likely to be generated as compared with the case of a thick end mill.

The technique disclosed in the present specification has been accomplished so as to solve the above-described problem of the conventional technique. Its objective is to provide an end mill machining apparatus, a CAM apparatus, an NC program, and a machining method which suppress regenerative self-excited vibration and mode-coupling self-excited vibration.

Means for Solving the Problem

An end mill machining apparatus according to one mode of the present disclosure comprises an end mill, and a control section for controlling the end mill. The ratio of a protrusion length of the end mill to a diameter of the end mill falls within a range of 5 to 50. The end mill is a variable pitch, uniform helix type or a variable helix type. The control section controls a contact angle between the end mill and the workpiece during machining to a critical contact angle $\theta_{lim}$ or smaller.

Effect of the Invention

In the present specification, there are provided an end mill machining apparatus, a CAM apparatus, an NC program, and a machining method which suppress regenerative self-excited vibration and mode-coupling self-excited vibration.

MODES FOR CARRYING OUT THE INVENTION

Specific embodiments will now be described with reference to the drawings, with an end mill machining apparatus, a CAM apparatus, an NC program, and a machining method being used as examples.

First Embodiment

1. End Mill Machining Apparatus

Figure 1:
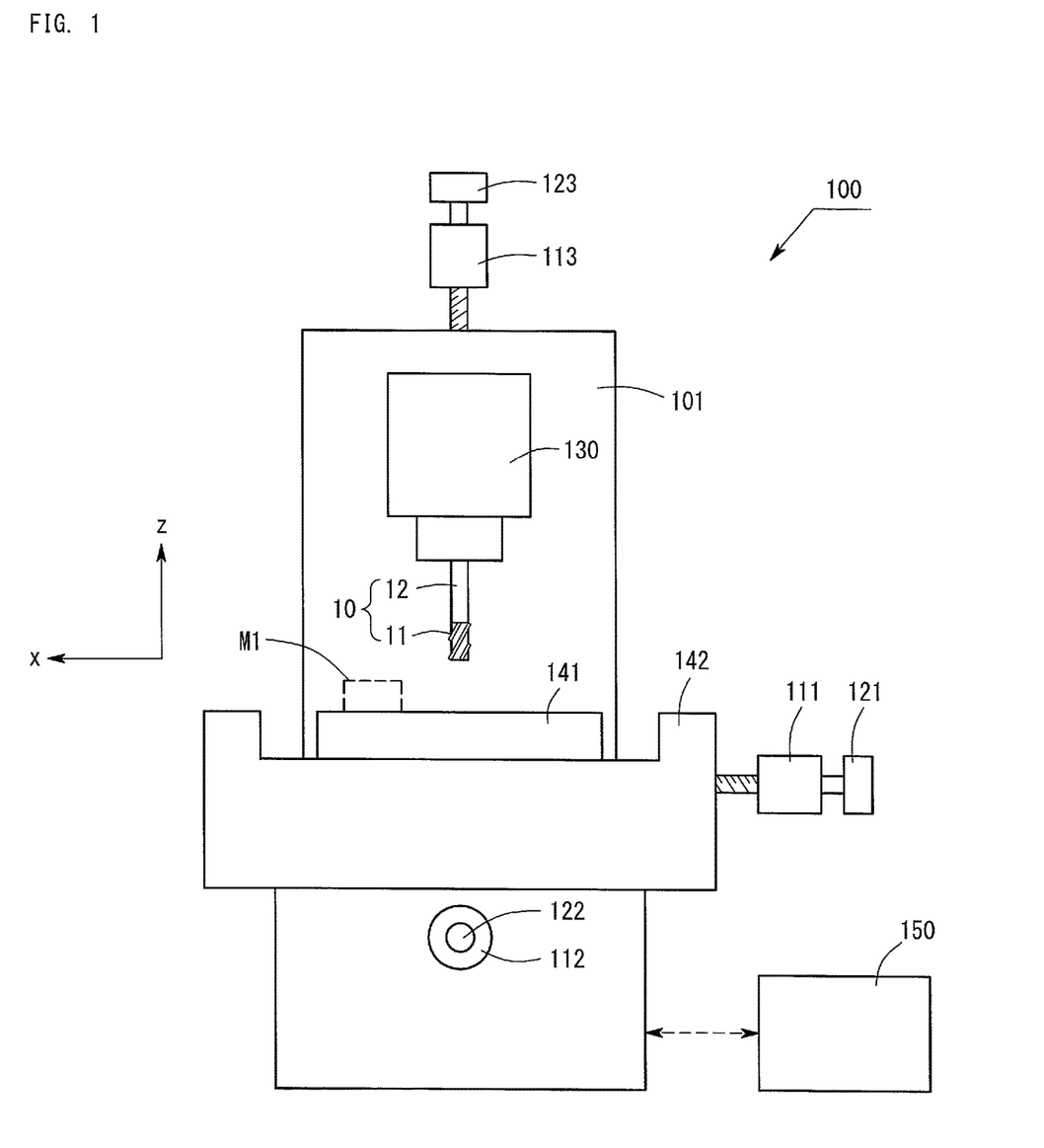
FIG. 1 View schematically showing the structure of an end mill machining apparatus according to a first embodiment.

FIG. 1 is a view showing an end mill machining apparatus 100 of the present embodiment. The end mill machining apparatus 100 includes an end mill 10, a machining unit 130, a body 101, an X-axis motor 111, a Y-axis motor 112, a Z-axis motor 113, an X-axis sensor 121, a Y-axis sensor 122, a Z-axis sensor 123, an X-axis feed table 141, a Y-axis feed table 142, and a control section 150.

The end mill 10 is a tool for machining a workpiece which is to be machined actually. The end mill 10 has a tooth portion 11 for machining the workpiece, and a non-tooth portion 12 which is formed integrally with the tooth portion 11 and which has no cutting teeth. The tooth portion 11 is located on the distal end side with respect to the non-tooth portion 12.

The machining unit 130 supports a spindle which holds the end mill 10. The machining unit 130 can be moved in a Z-axis direction by the Z-axis motor 113.

The X-axis feed table 141 is a table on which a workpiece M1 is disposed. The X-axis feed table 141 can be moved in an X-axis direction by the X-axis motor 111. The Y-axis feed table 142 can be moved in a Y-axis direction by the Y-axis motor 112. Therefore, the X-axis feed table 141 can be moved in the X-axis direction and the Y-axis direction.

The X-axis motor 111 is used to move the X-axis feed table 141 in the X-axis direction. The Y-axis motor 112 is used to move the Y-axis feed table 142 in the Y-axis direction. The Z-axis motor 113 is used to move the machining unit 130 in the Z-axis direction. These motors enable adjustment of the position of the end mill 10 relative to the workpiece M1.

Figure 2:
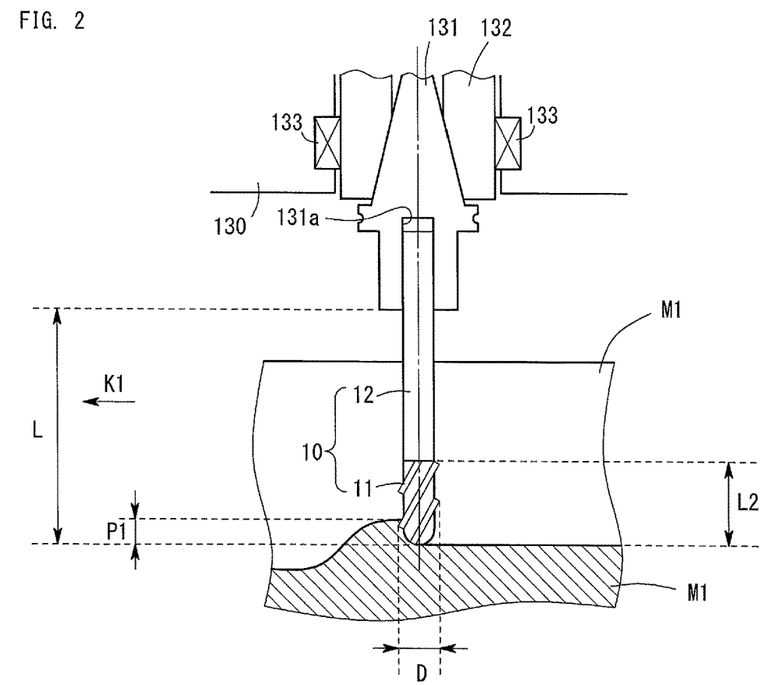
FIG. 2 Sectional view of the structure of an end mill and its vicinity of the end mill machining apparatus according to the first embodiment.

FIG. 2 is a sectional view schematically showing the internal structure of the machining unit 130. The machining unit 130 includes a tool holder 131, a rotation spindle 132, and a spindle bearing 133, as well as the end mill 10.

The tool holder 131 is a tool holding portion which grasps the end mill 10 and couples the end mill 10 with the rotation spindle 132. The tool holder 131 has a recess 131a. The end mill 10 is held in a state in which it is received by the recess 131a. A holding mechanism of the tool holder 131 for holding the end mill 10 is the same as that used in the conventional technique. The tool holder 131 is coupled with the rotation spindle 132 and is rotationally driven by the rotation spindle 132. Namely, the tool holder 131 rotates together with the end mill 10.

The spindle bearing 133 is one of bearings for supporting the rotation spindle 132. Therefore, the spindle bearing 133 supports all rotation members (from the rotation spindle 132 to the end mill 10) which rotate together.

The control section 150 controls respective portions of the end mill machining apparatus 100. In particular, the control section 150 controls the end mill 10 to depict a trochoid locus on the workpiece M1.

2. End Mill

The end mill 10 is very thin and long as compared with conventional end mills. The ratio of the protrusion length L of the end mill 10 to the diameter D of the end mill 10; i.e., the L/D ratio, is 5 to 50. The machining method of the present embodiment is suitable for the case where the ratio of the protrusion length L of the end mill 10 to the diameter D of the end mill 10; i.e., the L/D ratio, is 10 to 50.

The end mill 10 is of a variable helix type. The tooth portion 11 of the end mill 10 has, for example, two cutting teeth (blades). The number of the cutting teeth of the tooth portion 11 may be three or more.

3. Control System

Figure 3:
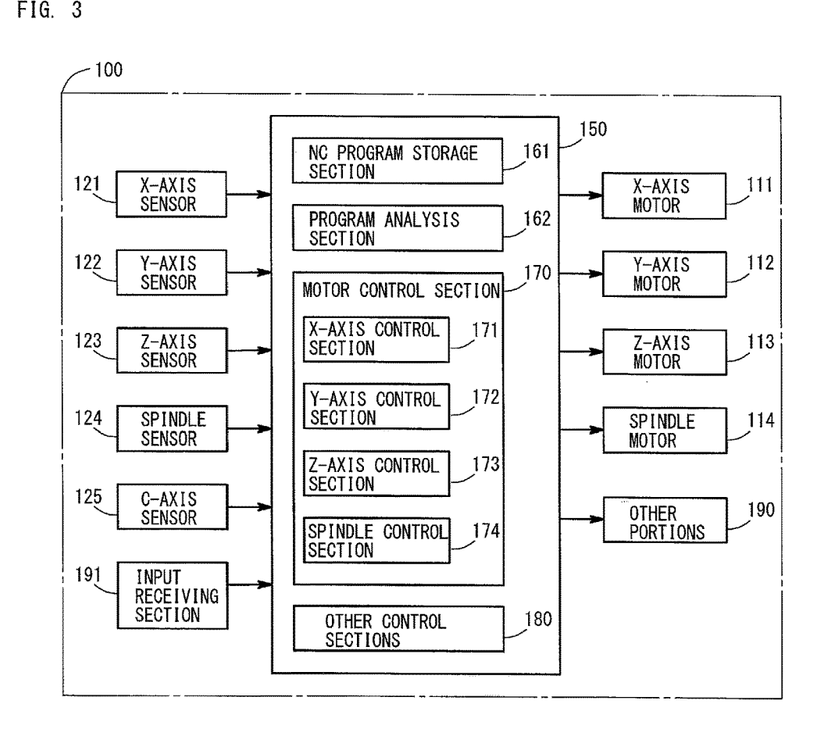
FIG. 3 Block diagram showing the control system of the end mill machining apparatus according to the first embodiment.

FIG. 3 shows the control system of the present embodiment. As shown in FIG. 3, the control section 150 includes an NC program storage section 161, a program analysis section 162, a motor control section 170, and other control sections 180.

The NC program storage section 161 stores an NC program. The program analysis section 162 analyzes the NC program stored in the NC program storage section 161 and executes the program. The motor control section 170 controls the motors.

The motor control section 170 includes an X-axis control section 171, a Y-axis control section 172, a Z-axis control section 173, and a spindle control section 174. The X-axis control section 171 controls the position of the workpiece M1 in the X-axis direction. The term "position" used herein refers to the relative position of the end mill 10 with respect to the workpiece M1. The Y-axis control section 172 controls the position of the workpiece M1 in the Y-axis direction. The Z-axis control section 173 controls the position of the workpiece M1 in the Z-axis direction. The spindle control section 174 controls rotation of the spindle supporting the end mill 10.

The X-axis sensor 121 measures the position of the workpiece M1 in the X-axis direction. The Y-axis sensor 122 measures the position of the workpiece M1 in the Y-axis direction. The Z-axis sensor 123 measures the position of the workpiece M1 in the Z-axis direction. The X-axis motor 111 changes the position of the workpiece M1 in the X-axis direction. The Y-axis motor 112 changes the position of the workpiece M1 in the Y-axis direction. The Z-axis motor 113 changes the position of the workpiece M1 in the Z-axis direction. The Z-axis motor 113 may change the position in the Z-axis direction of the machining unit 130 having the end mill 10.

The spindle sensor 124 detects rotation of the spindle. The spindle motor 114 rotates the spindle. An input receiving section 191 receives instructions entered by an operator. For example, the input receiving section 191 can receive the input of information representing the shape of the end mill 10 and information representing the material of the workpiece M1. Other portions 190 refer to structural portions of the end mill machining apparatus 100 other than the above-described portions.

As described above, the control section 150 controls the various portions of the end mill machining apparatus 100. As will be described later, the control section 150 controls the end mill 10 to depict a trochoid locus on the workpiece M1. In actuality, the X-axis control section 171 and the Y-axis control section 172 control the X-axis motor 111 and the Y-axis motor 112, respectively, such that the end mill 10 depicts a trochoid locus on the workpiece M1.

4. Machining Method

Here, a machining method of the end mill machining apparatus 100 of the present embodiment will be described. In this machining method, the control section 150 controls machining on the basis of the NC program. In the present embodiment, the control section 150 of the end mill machining apparatus 100 controls the end mill 10 to depict a trochoid locus on the workpiece M1.

Figure 4:
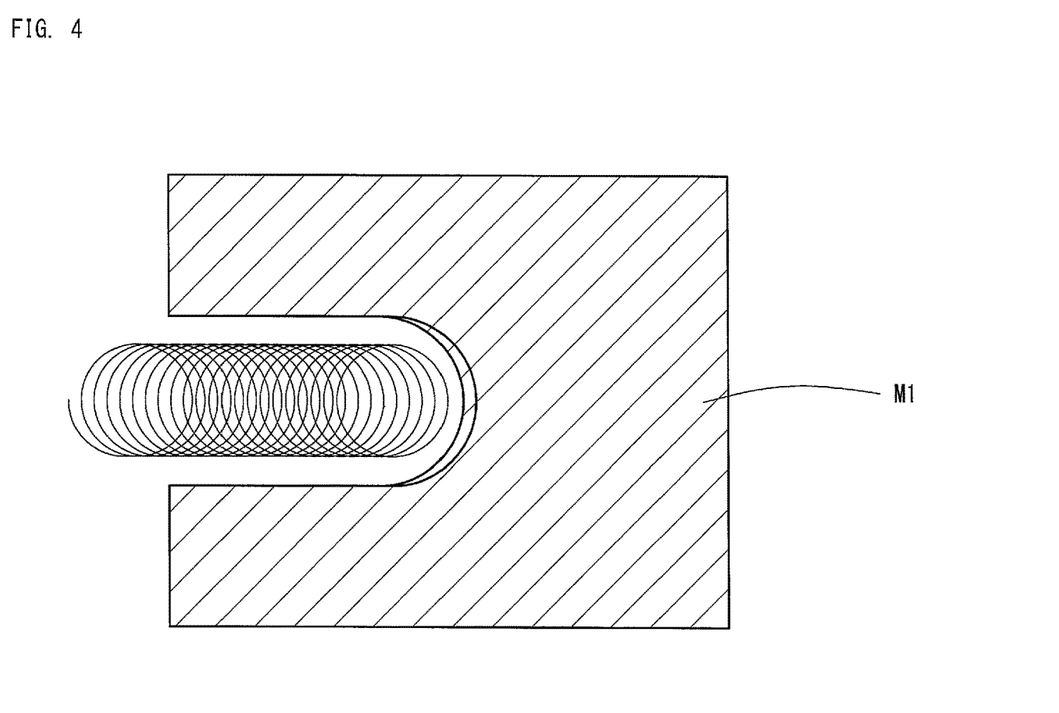
FIG. 4 First illustration used for describing a trochoid locus of the end mill in the first embodiment.

FIG. 4 is an illustration showing a trochoid locus depicted by the end mill 10. Since trochoid machining is performed, a contact angle, which is an angular range within which the end mill 10 is in contact with the workpiece M1 during machining, can be rendered smaller. Therefore, the trochoid machining can suppress (b-2) mode-coupling self-excited vibration.

Figure 5:
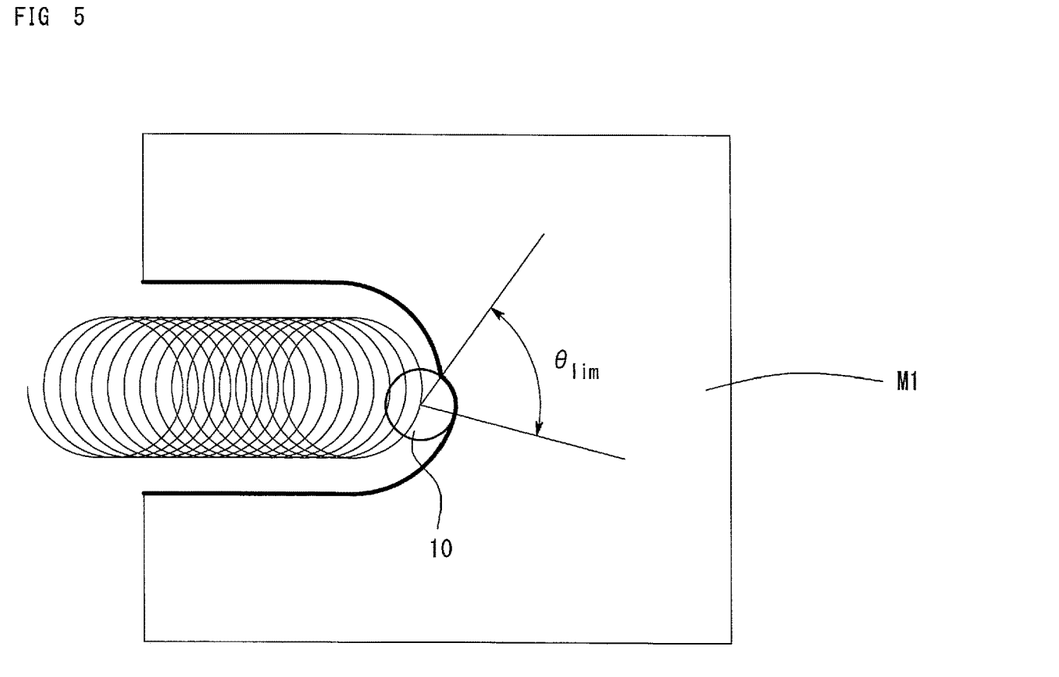
FIG. 5 Second illustration used for describing the trochoid locus of the end mill in the first embodiment.

FIG. 5 is an illustration showing the contact angle of the end mill 10 with respect to the workpiece M1 in the case where the end mill 10 is moved to depict a trochoid locus. The term "contact angle" used herein refers to an angular range within which the tooth portion 11 of the end mill 10 is in contact with the workpiece M1. A critical contact angle $\theta_{lim}$ refers to the maximum contact angle at which no mode-coupling self-excited vibration is generated. This critical contact angle $\theta_{lim}$ will be described later.

As a result of use of the variable lead end mill 10, (b-1) regenerative self-excited vibration can be suppressed.

As described above, both (b-1) regenerative self-excited vibration and (b-2) mode-coupling self-excited vibration can be suppressed when (1) the variable lead end mill 10 is used, (2) the workpiece M1 is machined by moving the end mill 10 to depict a trochoid locus, and (3) the workpiece M1 is machined with a contact angle equal to or smaller than the critical contact angle $\theta_{lim}$. Therefore, even when a large axial depth of cut P1 (see FIG. 2) is employed, stable machining can be performed.

Accordingly, the control section 150 renders the angle of contact between the end mill 10 and the workpiece M1 during machining equal to or smaller than the critical contact angle $\theta_{lim}$. As will be described later, for stabilization of machining, the axial depth of cut P1 of the end mill 10 is set to fall with the range of 7 mm to 9 mm. Therefore, as will be described later, productivity becomes 10 times or more.

The axial depth of cut P1 is considered to depend on the diameter D of the end mill 10. The greater the diameter D of the end mill 10, the greater the value to which the axial depth of cut P1 can be set. Therefore, the axial depth of cut P1 can be set to a value which is equal to or greater than ⅙ of the diameter D of the end mill 10.

5. Trochoid Machining and Suppression of Self-Excited Vibration 5-1. Critical Contact Angle $\theta_{lim}$ Here, the critical contact angle $\theta_{lim}$ will be described. The contact angle is an angle range over which the tooth portion 11 of the end mill 10 is in contact with the workpiece M1.

The critical contact angle $\theta_{lim}$ is the maximum contact angle at which no mode-coupling self-excited vibration is generated. Namely, no self-excited vibration is generated in the case where trochoid machining is performed in a state in which the end mill 10 is in contact with the workpiece M1 over a contact angle equal to or smaller than the critical contact angle $\theta_{lim}$. Self-excited vibration may be generated in the case where trochoid machining is performed in a state in which the end mill 10 is in contact with the workpiece M1 over a contact angle greater than the critical contact angle $\theta_{lim}$.

The workpiece M1 and the shape of the cutting teeth of the end mill 10 determine the critical contact angle $\theta_{lim}$. Therefore, when information representing the shape of the end mill 10 and information representing the material of the workpiece M1 are input to the end mill machining apparatus 100, the end mill machining apparatus 100 can perform machining while suppressing mode-coupling self-excited vibration.

5-2. Critical Contact Angle $\theta_{lim}$ and Machining Stability

In general, the following critical equation determines the stability against regenerative self-excited vibration and mode-coupling self-excited vibration.

[Equation 1]

$$\det\left[[I] - \frac{1}{2}aK_t(1 - e^{-i\omega_c T})[A_0][G(i\omega_c)]\right] = 0 \quad (1)$$

I: two-dimensional unit matrix
a: axial depth of cut
Kt: specific cutting force
$\omega_c$: chatter frequency
T: inter-tooth delay time
$A_0$: DC component of a cutting force coefficient matrix
$G(i\omega_c)$: transfer function at the chatter frequency The DC component $A_0$ of the cutting force coefficient matrix is given by the following equation.

[Equation 2]

$$[A_0] = \frac{N}{2\pi}\int_{\theta_{st}}^{\theta_{ed}}[A(\theta)]d\theta = \begin{bmatrix} \alpha_{0xx} & \alpha_{0xy} \\ \alpha_{0yx} & \alpha_{0yy} \end{bmatrix} \quad (2)$$

$$\alpha_{0xx} = \frac{N}{4\pi}[\cos 2\theta - 2k_y\theta + kr\sin 2\theta]_{\theta_{st}}^{\theta_{ed}},$$

$$\alpha_{0xy} = \frac{N}{4\pi}[-\sin 2\theta - 2\theta + kr\cos 2\theta]_{\theta_{st}}^{\theta_{ed}}$$

$$\alpha_{0yx} = \frac{N}{4\pi}[-\sin 2\theta + 2\theta + kr\cos 2\theta]_{\theta_{st}}^{\theta_{ed}},$$

$$\alpha_{0yy} = \frac{N}{4\pi}[-\cos 2\theta - 2k_y\theta - kr\sin 2\theta]_{\theta_{st}}^{\theta_{ed}}$$

N: number of cutting teeth
kr: cutting force ratio
$\theta_{st}$: cutting start angle of each tooth
$\theta_{ed}$: cutting end angle of each tooth The cutting force ratio kr is the ratio of thrust force to principal force. The cutting force ratio kr is represented by an equation of kr=K2/K1 where K1 is the specific cutting force in the principal force direction, and K2 is the specific cutting force in the thrust force direction. In the case of up milling, $\theta_{st}=0$ and $\theta_{ed}=\theta_{lim}$. In the case of down milling, $\theta_{st}=\pi-\theta_{lim}$ and $\theta_{ed}=\pi$.

Under the assumption that the variable lead end mill exhibits its complete effect, the regenerative term $\exp(-i\omega_c T)$ of Equation (1) becomes zero. Namely, Equation (1) is represented by the following equation.

[Equation 3]

$$\det\left[[I] - \frac{1}{2}aK_t[A_0][G(i\omega_c)]\right] = 0 \quad (3)$$

The axial depth of cut a and the chatter frequency $\omega_c$ which make both the real and imaginal parts of Equation (3) zero are a critical axial depth of cut $a_{lim}$ and a critical frequency $\omega_{clim}$ at which self-excited vibration may be generated.

The transfer function G is represented by using modal parameters. Here, the nondiagonal terms $G_{xy}$ and $G_{yx}$ are assumed to be considerably smaller than the diagonal terms $G_{xx}$ and $G_{yy}$, and $G_{xy}$ and $G_{yx}$ are set to 0. Thus, the transfer function G is represented by the following equation.

[Equation 4]

$$G(i\omega) = \begin{bmatrix} G_{xx} & 0 \\ 0 & G_{yy} \end{bmatrix} = \begin{bmatrix} \dfrac{1}{-m_{xx}\omega^2 + ic_{xx}\omega + k_{xx}} & 0 \\ 0 & \dfrac{1}{-m_{yy}\omega^2 + ic_{yy}\omega + k_{yy}} \end{bmatrix} \quad (4)$$

Notably, even when Gxy and Gyx are set to zero, the nondiagonal components of the DC component $A_0$ of the cutting force coefficient matrix are not zero. Therefore, even under the above-described assumption, mode-coupling self-excited vibration may be generated. Namely, the analysis performed here is an analysis under the conditions in which mode-coupling self-excited vibration may be generated. Also, since the end mill 10 is approximately axial symmetry, the assumption that $G_{xy}=G_{yx}=0$ is considered to be appropriate.

5-3. Relation Between Cutting Force Ratio Kr and Critical Contact Angle $\theta_{lim}$ Under the conditions of the above-described Equations (3) and (4), the relation between cutting force ratio kr and critical contact angle $\theta_{lim}$ was analyzed. For the analysis, 2406 (Mpa) was used as the specific cutting force Kt. Also, the following transfer functions G1 and G2 were used.

G1

$m_{xx}=7.7108\times10^{-3}$ (kg)

$c_{xx}=1.9844$ (N·s/m)

$k_{xx}=0.5905\times10^6$ (N/m)

$m_{yy}=7.5263\times10^{-3}$ (kg)

$c_{yy}=2.1023$ (N·s/m)

$k_{yy}=0.4958\times10^6$ (N/m)

G2

$m_{xx}=45.5\times10^{-3}$ (kg)

$c_{xx}=13.6315$ (N·s/m)

$k_{xx}=4.8633\times10^6$ (N/m)

$m_{yy}=42.4\times10^{-3}$ (kg)

$c_{yy}=15.0255$ (N·s/m)

$k_{yy}=4.5432\times10^6$ (N/m)

Notably, the contact angle θ at which a solution satisfying Equation (3) did not appear even when the axial depth of cut a was increased infinitely was employed as the critical contact angle $\theta_{lim}$.

Figure 6:
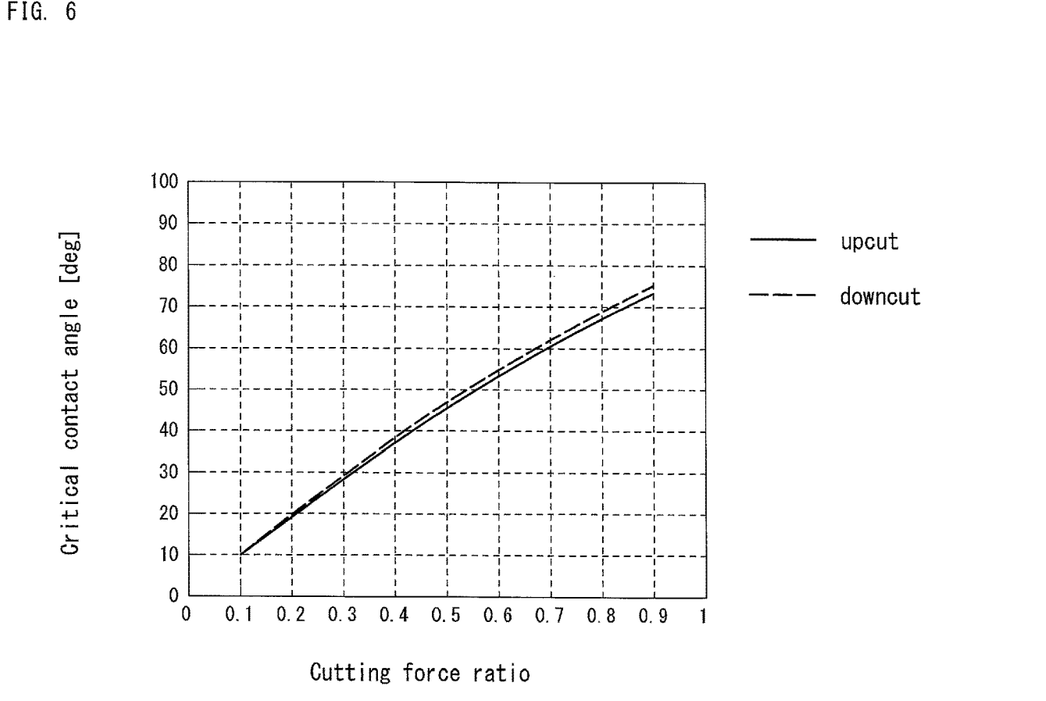
FIG. 6 First graph showing the relation between cutting force ratio kr and critical contact angle $\theta_{lim}$.

FIG. 6 is a first graph showing the relation between the cutting force ratio kr and the critical contact angle $\theta_{lim}$. The horizontal axis of FIG. 6 represents the cutting force ratio kr. The vertical axis of FIG. 6 represents the critical contact angle $\theta_{lim}$ (°). FIG. 6 shows the relation for the case of up milling and the relation for the case of down milling. The transfer function G1 was used for the analysis for determining the relation. The difference between the critical contact angle $\theta_{lim}$ for the case of up milling and the critical contact angle $\theta_{lim}$ for the case of down milling is small.

As shown in FIG. 6, as the cutting force ratio kr increases, the critical contact angle $\theta_{lim}$ increases. Regions below the lines of FIG. 6 are ranges in which stable machining is possible. For example, in the case where the cutting force ratio kr is 0.3, the critical contact angle $\theta_{lim}$ is about 29°. Therefore, when the contact angle over which the end mill 10 comes into contact with the workpiece M1 is set to 29° or smaller, generation of self-excited vibration can be avoided.

As shown in FIG. 6, the difference between the critical contact angle $\theta_{lim}$ for the case of up milling and the critical contact angle $\theta_{lim}$ for the case of down milling is small. However, in the case of down milling, the critical contact angle $\theta_{lim}$ is slightly greater than that in the case of up milling. Namely, through employment of down milling, the end mill machining apparatus 100 can perform machining more stably. Accordingly, down milling is preferred. Namely, it is preferred that the rotation direction of the end mill 10 is opposite the rotation direction of the trochoid locus.

Figure 7:
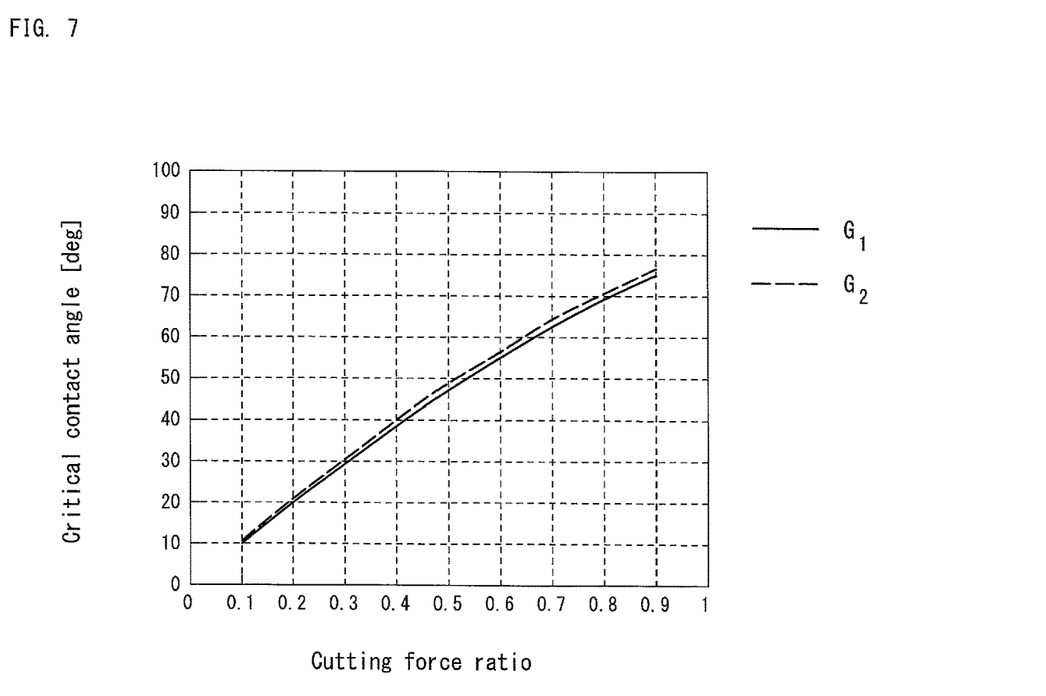
FIG. 7 Second graph showing the relation between cutting force ratio kr and critical contact angle $\theta_{lim}$.

FIG. 7 is a second graph showing the relation between the cutting force ratio kr and the critical contact angle $\theta_{lim}$. The horizontal axis of FIG. 7 represents the cutting force ratio kr. The vertical axis of FIG. 7 represents the critical contact angle $\theta_{lim}$ (°). FIG. 7 shows the relation for the case where the transfer function G1 is used and the relation for the case where the transfer function G2 is used. The lines of FIG. 7 show the results of an analysis performed for the case where cutting was performed in a down milling mode. The difference between the critical contact angle $\theta_{lim}$ for the case of the transfer function G1 and the critical contact angle $\theta_{lim}$ for the case of the transfer function G2 is small.

As shown in FIG. 7, as the cutting force ratio kr increases, the critical contact angle $\theta_{lim}$ increases. Regions below the lines of FIG. 7 are ranges in which stable machining is possible.

6. Effects of the Present Embodiment

The end mill machining apparatus 100 of the present embodiment has the variable helix type thin and long end mill 10, and machines the workpiece M1 by moving the end mill 10 to depict a trochoid locus. Therefore, the variable helix type end mill 10 suppresses (b-1) regenerative self-excited vibration. Also, the machining method which moves the end mill 10 to depict a trochoid locus suppresses (b-2) mode-coupling self-excited vibration. Thus, when a narrow and deep groove is formed, the end mill machining apparatus 100 of the present embodiment can suppress both of (b-1) regenerative self-excited vibration and (b-2) mode-coupling self-excited vibration.

As described above, the end mill machining apparatus 100 can easily form a narrow and deep groove through machining as compared with the conventional end mill machining apparatus. Since self-excited vibrations can be suppressed, the machining accuracy of the end mill machining apparatus 100 of the present embodiment is higher than that of the conventional end mill machining apparatus. Also, the machining speed of the end mill machining apparatus 100 of the present embodiment is higher than that of the conventional end mill machining apparatus. Also, in the end mill machining apparatus 100 of the present embodiment, self-excited vibrations are less likely to be generated. Therefore, the end mill 10 is less likely to be broken.

7. Modifications 7-1. Trochoid Locus

In the end mill machining apparatus 100 of the present embodiment, the end mill 10 moves to depict a trochoid locus on the workpiece M1. The trochoid locus is the locus of a motion produced by superposing a circular motion and a translational motion. In the present embodiment, the end mill 10 does not move in the X-axis direction and the Y-axis direction, and only the workpiece M1 moves in the X-axis direction and the Y-axis direction. However, the end mill 10 may be moved in the X-axis direction and the Y-axis direction. For example, whereas the end mill 10 is caused to produce a circular motion, the workpiece M1 is caused to produce a translational motion. In this case as well, the end mill 10 can be moved to depict a trochoid locus on the workpiece M1.

7-2. Variable Pitch

The end mill machining apparatus 100 of the present embodiment may use a variable pitch, uniform lead end mill in place of the variable lead end mill 10. In this case as well, (b-1) regenerative self-excited vibration can be suppressed.

7-3. Chatter Vibration Frequency Detection Section

Preferably, the control section 150 includes a chatter vibration frequency detection section and a computation section. The chatter vibration frequency detection section has a function of detecting the frequency of chatter vibration of the end mill 10. The computation section computes a spindle rotational speed and a trochoid locus which can properly suppress self-excited vibrations, on the basis of the above-described chatter vibration frequency, the above-described information of the tooth portion, and the above-described information of the material of the workpiece M1.

7-4. Relative Position of End Mill with Respect to Workpiece

In the present embodiment, the X-axis, Y-axis, and Z-axis coordinates of the end mill 10; namely, the relative position of the end mill 10 with respect to the workpiece M1 are adjusted as in the end mill machining apparatus 100. However, needless to say, there exist other methods for adjusting the relative position of the end mill 10 with respect to the workpiece M1 by using actuators. The present embodiment merely shows one example thereof, and the present invention is not limited thereto.

7-5. Combinations of Modifications

Needless to say, the above-described modifications may be combined freely.

8. Summary of Present Embodiment

The end mill machining apparatus 100 of the present embodiment has the variable helix type thin and long end mill 10, and machines the workpiece M1 by moving the end mill 10 to depict a trochoid locus. Therefore, when a narrow and deep groove is formed through machining, the end mill machining apparatus 100 of the present embodiment can suppress both of (b-1) regenerative self-excited vibration and (b-2) mode-coupling self-excited vibration. As a result, the end mill machining apparatus 100 can easily form a narrow and deep groove through machining as compared with the conventional end mill machining apparatus.

Since self-excited vibrations can be suppressed, the machining accuracy of the end mill machining apparatus 100 of the present embodiment is higher than that of the conventional end mill machining apparatus. Also, the machining speed of the end mill machining apparatus 100 of the present embodiment is higher than that of the conventional end mill machining apparatus. Also, in the end mill machining apparatus 100 of the present embodiment, self-excited vibrations are less likely to be generated. Therefore, the end mill 10 is less likely to be broken.

Second Embodiment

A second embodiment will be described. In the present embodiment, a machining system which includes the end mill machining apparatus of the first embodiment will be described.

1. Configuration of System

Figure 8:
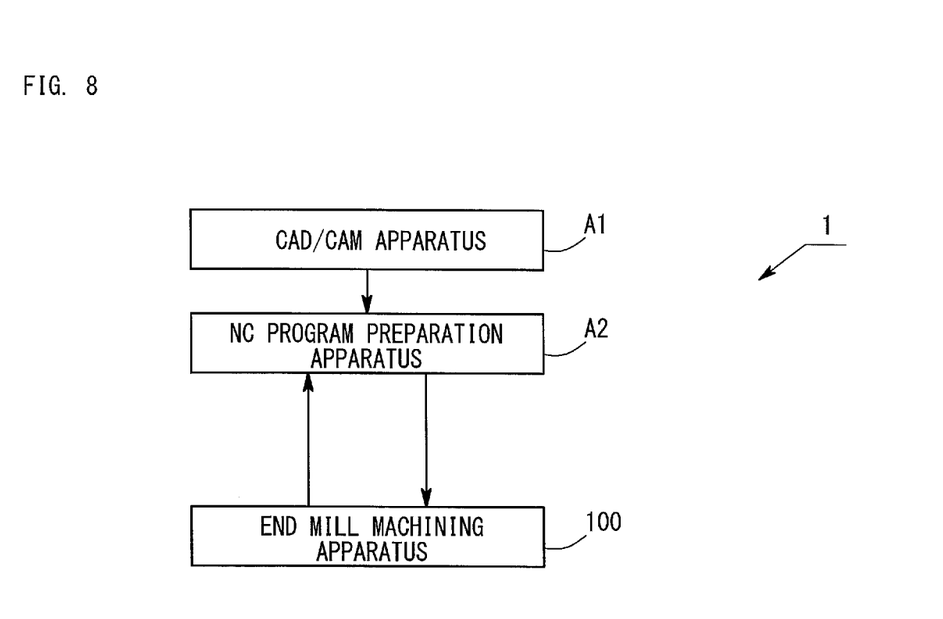
FIG. 8 Conceptual diagram used for describing an end mill machining system according to a second embodiment.

FIG. 8 shows the overall configuration of the present embodiment. As shown in FIG. 8, the machining system 1 includes a CAD/CAM apparatus A1, an NC program preparation apparatus A2, and the end mill machining apparatus 100.

The CAD/CAM apparatus A1 includes a CAD function section which performs part design, mold design, etc., and a CAM function section which designs a production process from 3D data produced as a result of the part design, mold design, etc. and determines NC data, including a tool locus, a depth of cut, etc. The NC program preparation apparatus A2 produces an NC program from the NC data determined by the CAD/CAM apparatus A1.

2. CAD/CAM Apparatus

The CAD/CAM apparatus A1 determines a trochoid locus in consideration of the shape of the end mill 10. Then, on the basis of the diameter D and the protrusion length L of the end mill 10, etc., the CAD/CAM apparatus A1 determines the rotational speed of the end mill 10 and the depth of cut in the axial direction which fall within a stable region determined from the results of an analysis which will be described later. Namely, the CAD/CAM apparatus A1 holds data of a stable region for machining which is determined, from the results of the below-described analysis, for each of combinations of the diameters D and the protrusion lengths L of various types of end mills 10.

Therefore, the CAD/CAM apparatus A1 aids process design and work design by using the information representing the shape of the end mill 10 and the information representing the material of the workpiece M1. Specifically, on the basis of data of the workpiece M1 and data of the stable region for the combination of the diameter D and the protrusion length L of an end mill 10 to be used, the CAD/CAM apparatus A1 performs design assist so as to obtain optimal machining conditions. The term "design assist" used herein refers to "assisting the process design and the work design."

3. NC Program

Alternatively, an NC program operates the end mill machining apparatus 100 on the basis of the information representing the shape of the end mill 10 and the information representing the material of the workpiece M1. Specifically, on the basis of data of the workpiece M1 and data of the stable region for the combination of the diameter D and the protrusion length L of an end mill 10 to be used, the NC program may determine the rotational speed of the end mill 10 and the depth of cut in the axial direction within the stable region.

4. Modifications
4-1. Machining Shape

Needless to say, the end mill machining apparatus 100 having been described above can produce not only a groove shape but also other three-dimensional shapes through machining.

Third Embodiment

A third embodiment will be described. In the present embodiment, a locus which differs from the trochoid locus of the first embodiment will be described. Loci which will be described below may be employed as long as the contact angle between the end mill 10 and the workpiece M1 is equal to or smaller than the critical contact angle $\theta_{lim}$.

Figure 9:
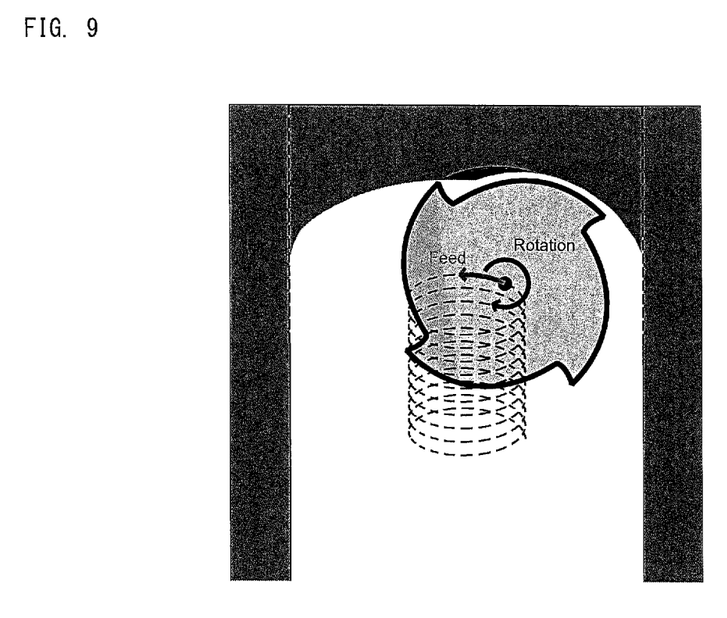
FIG. 9 Illustration showing a locus of a motion produced by superposing an elliptical motion and a translational motion.

1. Locus of Motion Produced by Superposing Elliptical Motion and Translational Motion FIG. 9 shows the case where the locus of the end mill 10 is the locus of a motion produced by superposing an elliptical motion and a translational motion. As shown in FIG. 9, even when the locus of a motion produced by superposing an elliptical motion and a translational motion is used as the locus of the end mill 10, the contact angle between the end mill 10 and the workpiece M1 can be made equal to or smaller than the critical contact angle $\theta_{lim}$. In this case as well, mode-coupling self-excited vibration can be suppressed.

Figure 10:
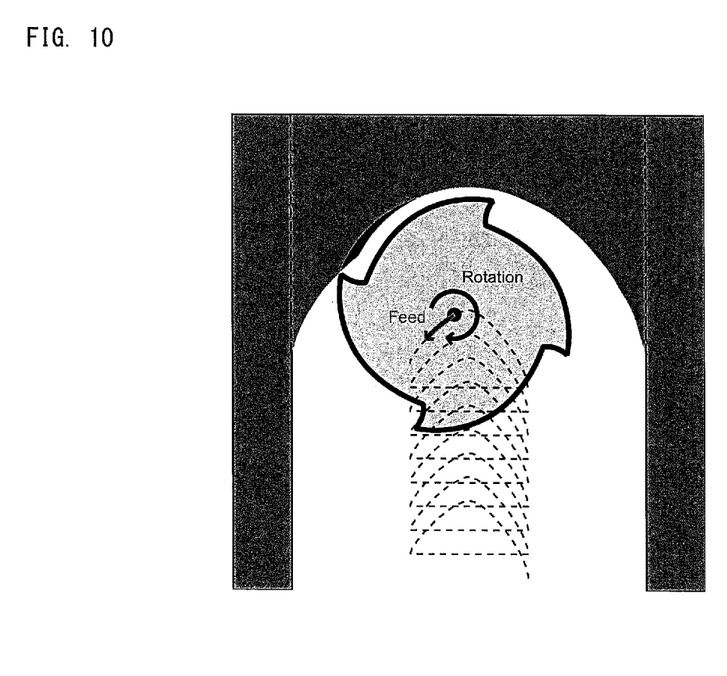
FIG. 10 Illustration showing a locus of a motion produced by superposing a triangular rotational motion and a translational motion.

2. Locus of Motion Produced by Superposing Triangular Rotational Motion and Translational Motion FIG. 10 shows the case where the locus of the end mill 10 is the locus of a motion produced by superposing a triangular rotational motion and a translational motion. As shown in FIG. 10, even when the locus of a motion produced by superposing a quasi-triangular rotational motion and a translational motion is used as the locus of the end mill 10, the contact angle between the end mill 10 and the workpiece M1 can be made equal to or smaller than the critical contact angle $\theta_{lim}$. In this case as well, mode-coupling self-excited vibration can be suppressed.

3. Locus of Motion Produced by Superposing Arbitrary Closed-Curvilinear Motion and Translational Motion Even in the case of use of the locus of a motion produced by superposing an arbitrary closed-curvilinear motion and a translational motion, the contact angle between the end mill 10 and the workpiece M1 can be made equal to or smaller than the critical contact angle $\theta_{lim}$. Also, instead of the translational motion, an arbitrary curvilinear motion may be employed. In such a case, the control section 150 controls the end mill 10 to move relative to the workpiece M1 so as to depict the locus of a motion produced by superposing a closed-curvilinear motion on a rectilinear motion or a curvilinear motion.

EXAMPLE

1. Analysis

An analysis which was carried out on the stability of machining on the above-described results will be described. In the present analysis, simulation was performed for the following four cases:

(C1) the case where slotting was performed with a uniform pitch, uniform lead end mill;
(C2) the case where slotting was performed with a variable lead end mill;
(C3) the case where machining was performed with a uniform pitch, uniform lead end mill; and
(C4) the case where machining was performed with a variable lead end mill.

In the case (C4), the machining methods of the first embodiment and the third embodiment are used. However, this analysis does not involve the conditions on the locus of the end mill. Namely, the case (C4) corresponds to the case where the end mill 10 is controlled to depict the locus of a motion produced by superposing a rectilinear motion or a curvilinear motion on an arbitrary closed-curvilinear motion. Table 2 shows the specifications of the end mill used in the analysis.

TABLE 2

| Type | Diameter | Number of teeth | Helix angle $\beta_1$ | Helix angle $\beta_2$ |
|---|---|---|---|---|
| Uniform pitch, uniform lead | 6 mm | 2 | 30° | 30° |
| Variable lead | 6 mm | 2 | 27.05° | 32.79° |

Figure 11:
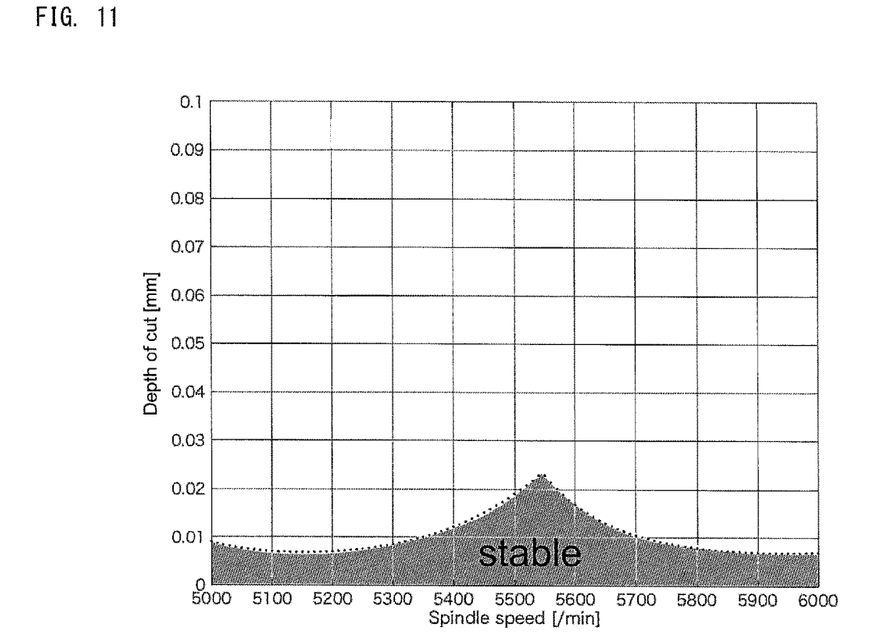
FIG. 11 Graph showing the results of an analysis performed for the case where slotting was performed through use of a uniform pitch, uniform lead end mill.

FIG. 11 is a graph showing the results of an analysis performed for the case where slotting was performed through use of a uniform pitch, uniform lead end mill. The horizontal axis of FIG. 11 represents the rotational speed (rpm) of the end mill. The vertical axis of FIG. 11 represents the depth of cut (mm) in the axial direction. As shown in FIG. 11, stable machining is possible when the axial depth of cut of the end mill is about 0.01 mm. Therefore, when a groove having a depth of several centimeters to several tens of centimeters is formed through machining, a very long machining time is needed.

Figure 12:
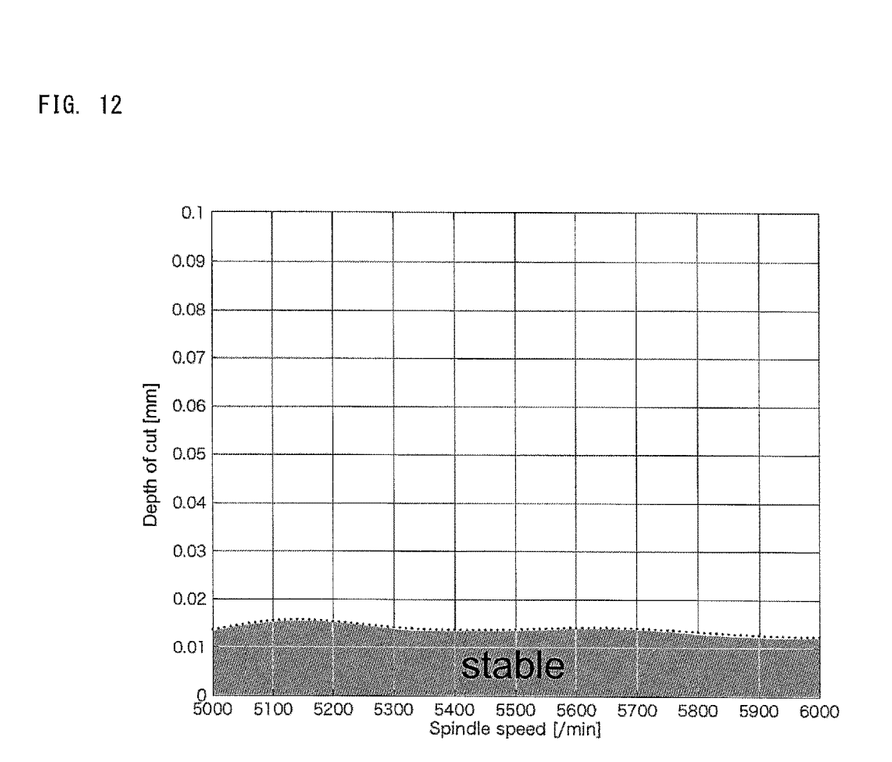
FIG. 12 Graph showing the results of an analysis performed for the case where slotting was performed through use of a variable lead end mill.

FIG. 12 is a graph showing the results of an analysis performed for the case where slotting was performed through use of a variable lead end mill. The horizontal axis of FIG. 12 represents the rotational speed (rpm) of the end mill. The vertical axis of FIG. 12 represents the depth of cut (mm) in the axial direction. As shown in FIG. 12, stable machining is possible when the axial depth of cut of the end mill is about 0.01 mm. Therefore, when a groove having a depth of several centimeters to several tens of centimeters is formed through machining, a very long machining time is needed.

Figure 13:
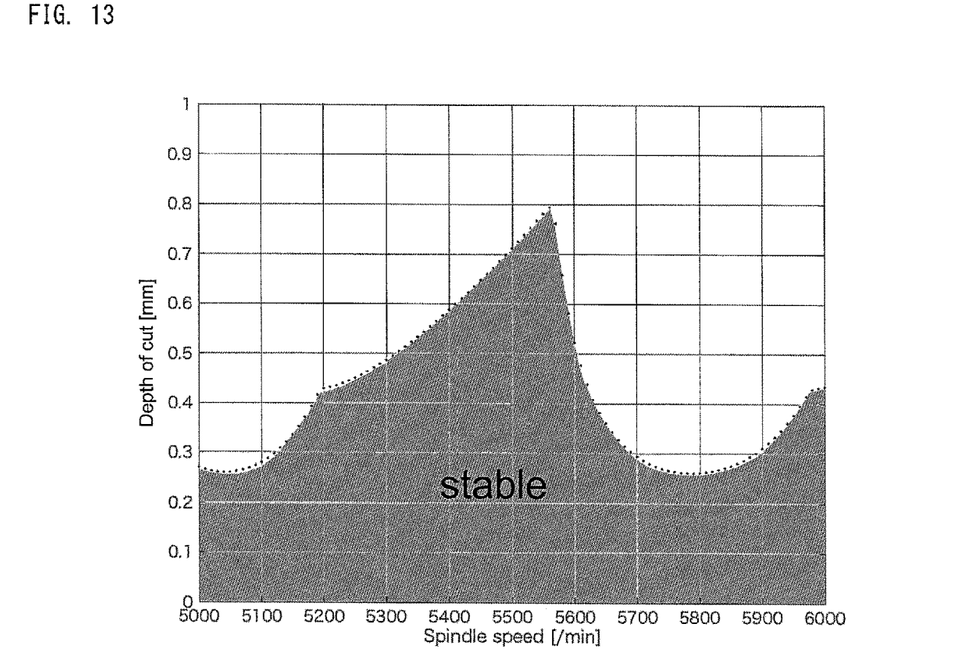
FIG. 13 Graph showing the results of an analysis performed for the case where trochoid machining was performed through use of a uniform pitch, uniform lead end mill.

FIG. 13 is a graph showing the results of an analysis performed for the case where machining was performed through use of a uniform pitch, uniform lead end mill. The horizontal axis of FIG. 13 represents the rotational speed (rpm) of the end mill. The vertical axis of FIG. 13 represents the depth of cut (mm) in the axial direction. As shown in FIG. 13, stable machining is possible when the axial depth of cut of the end mill is about 0.2 mm. Therefore, when a groove having a depth of several centimeters to several tens of centimeters is formed through machining, a rather long machining time is needed.

Figure 14:
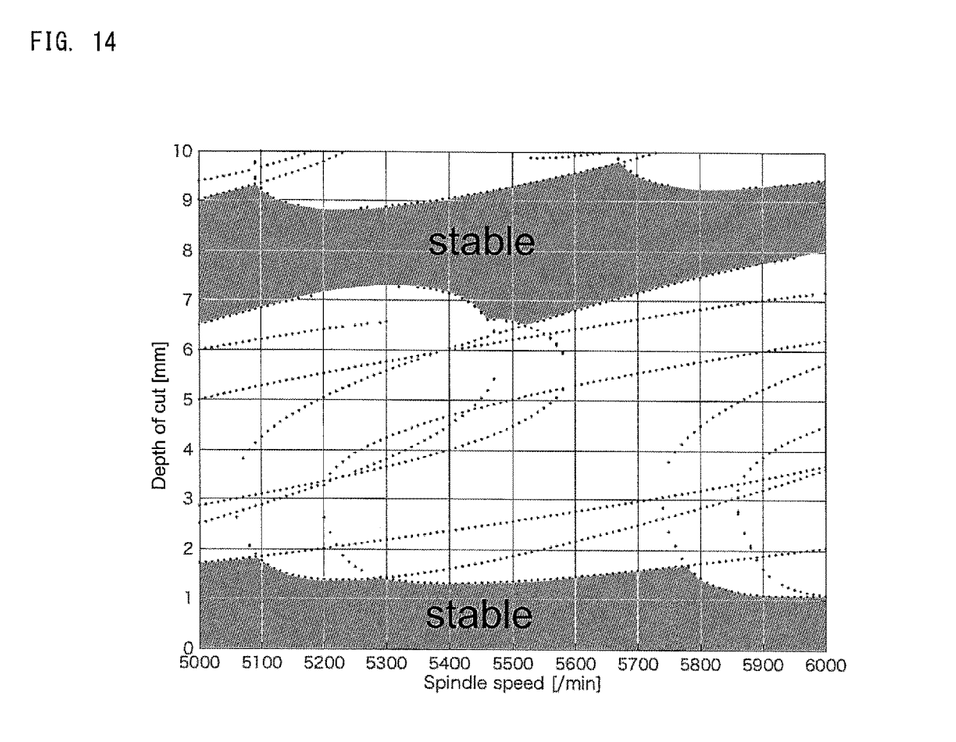
FIG. 14 Graph showing the results of an analysis performed for the case where trochoid machining was performed through use of a variable lead end mill.

FIG. 14 is a graph showing the results of an analysis performed for the case where machining was performed through use of a variable lead end mill. The horizontal axis of FIG. 14 represents the rotational speed (rpm) of the end mill. The vertical axis of FIG. 14 represents the depth of cut (mm) in the axial direction. As shown in FIG. 14, stable machining is possible when the axial depth of cut of the end mill is about 1 mm. Also, even when the axial depth of cut of the end mill is 7 mm to 9 mm, machining can be performed stably. Therefore, when a groove having a depth of several centimeters to several tens of centimeters is formed through machining, only a short machining time is needed.

In the case where slotting was performed through use of a uniform pitch, uniform lead end mill (the case of FIG. 11), a volume removal ratio VR1 at a rotational speed for enabling the most preferred machining was 37 (a.u.). In the case where slotting was performed through use of a variable lead end mill (the case of FIG. 12), a volume removal ratio VR2 at a rotational speed for enabling the most preferred machining was 21 (a.u.). In the case where machining was performed through use of a uniform pitch, uniform lead end mill (the case of FIG. 13), a volume removal ratio VR3 at a rotational speed for enabling the most preferred machining was 41 (a.u.). In the case where machining was performed through use of a variable lead end mill (the case of FIG. 14), a volume removal ratio VR4 at a rotational speed for enabling the most preferred machining was 497 (a.u.). Accordingly, the machining methods of the first embodiment and the third embodiment (FIG. 14) each have an efficiency at least 12 times the efficiencies of the conventional machining methods (FIGS. 11, 12, and 13).

Conceivably, the end mill machining apparatuses 100 of the first embodiment and the third embodiment suppress (b-1) regenerative self-excited vibration and (b-2) mode-coupling self-excited vibration. Conceivably, as a result of suppression of the above-described self-excited vibrations, the end mill machining apparatuses 100 each have an improved machining stability. This is because the above-described two types of self-excited vibrations are likely to increase exponentially and are very sensitive to machining stability.

As described above, the present disclosure includes an end mill machining apparatus, a CAM apparatus, an NC program, and a machining method which are itemized below.

1. Item 1

An end mill machining apparatus which includes an end mill and a control section for controlling the end mill, wherein a ratio of a protrusion length of the end mill to a diameter of the end mill falls within a range of 5 to 50, the end mill is a variable pitch, uniform helix type or a variable helix type, and the control section controls a contact angle between the end mill and the workpiece during machining to a critical contact angle $\theta_{lim}$, or smaller.

This end mill machining apparatus can suppress generation of regenerative self-excited vibration and mode-coupling self-excited vibration. Therefore, breakage of the end mill hardly occurs. Also, machining accuracy hardly deteriorates due to intensification of vibration. Therefore, this end mill machining apparatus is suitable for formation of a narrow and deep groove through machining.

2. Item 2

In the end mill machining apparatus described in Item 1, the control section controls the end mill to move relative to a workpiece so as to depict a locus of a motion produced by superposing a closed-curvilinear motion and a rectilinear motion or a curvilinear motion.

3. Item 3

In the end mill machining apparatus described in Item 2, the control section controls the end mill to move relative to a workpiece so as to depict a trochoid locus.

4. Item 4

In the end mill machining apparatus described in any one of Items 1 to 3, an axial depth of cut of the end mill is equal to or greater than one-sixth of a diameter of the end mill.

5. Item 5

In the end mill machining apparatus described in any one of Items 1 to 4, a rotation direction of the end mill is opposite a rotation direction of the trochoid locus.

6. Item 6

A CAM apparatus for aiding the end mill machining apparatus described in any one of Items 1 to 5, the CAM apparatus aiding process design or work design by using tooth information of the end mill and material information of the workpiece.

7. Item 7

An NC program for operating the end mill machining apparatus described in any one of Items 1 to 5, the NC program operating the end mill machining apparatus on the basis of tooth information of the end mill and material information of the workpiece.

8. Item 8

A machining method for machining a workpiece by using an end mill, comprising: using, as the end mill, an end mill of a variable pitch, uniform helix type or a variable helix type which is configured such that a ratio of a protrusion length of the end mill to a diameter of the end mill falls within a range of 5 to 50; and machining the workpiece in a state in which a contact angle between the end mill and the workpiece during the machining is a critical contact angle $\theta_{lim}$ or smaller.

9. Item 9

In the machining method described in Item 8, the workpiece is machined by moving the end mill relative to the workpiece to depict a trochoid locus.

DESCRIPTION OF REFERENCE NUMERALS

100 . . . end mill machining apparatus
10 . . . end mill
11 . . . tooth portion
12 . . . non-tooth portion
150 . . . control section

The invention claimed is:

1. An end mill machining apparatus comprising:
an end mill; and
a control section for controlling the end mill,
a ratio of a protrusion length of the end mill to a diameter of the end mill falls within a range of 5 to 50;
the end mill is a variable pitch, uniform helix type or a variable helix type; and
the control section controls a contact angle between the end mill and a workpiece during machining to a critical contact angle $\theta_{lim}$ or smaller,
the critical contact angle $\theta_{lim}$ is the angle when a solution satisfying the following equation does not appear even when the axial depth of cut a is increased to infinity, $$\det\left[[I] - \frac{1}{2}aK_t[A_0][G(i\omega_c)]\right] = 0$$

I: two-dimensional unit matrix
a: axial depth of cut
Kt: specific cutting force
$\omega_c$: chatter frequency
$A_0$: DC component of a cutting force coefficient matrix
$G(i\omega_c)$: transfer function at the chatter frequency.

2. An end mill machining apparatus according to claim 1, wherein the control section controls the end mill to move relative to the workpiece so as to depict a locus of a motion produced by superposing a closed-curvilinear motion and a rectilinear motion or a curvilinear motion.

3. An end mill machining apparatus according to claim 2, wherein the control section controls the end mill to move relative to the workpiece so as to depict a trochoid locus.

4. An end mill machining apparatus according to claim 1, wherein an axial depth of cut of the end mill is equal to or greater than one-sixth of a diameter of the end mill.

5. An end mill machining apparatus according to claim 2, wherein an axial depth of cut of the end mill is equal to or greater than one-sixth of a diameter of the end mill.

6. An end mill machining apparatus according to claim 3, wherein an axial depth of cut of the end mill is equal to or greater than one-sixth of a diameter of the end mill.

7. An end mill machining apparatus according to claim 2, wherein a rotation direction of the end mill is opposite a rotation direction of the trochoid locus.

8. An end mill machining apparatus according to claim 2, wherein a rotation direction of the end mill is opposite a rotation direction of the trochoid locus.

9. An end mill machining apparatus according to claim 3, wherein a rotation direction of the end mill is opposite a rotation direction of the trochoid locus.

10. A CAM apparatus for aiding the end mill machining apparatus according to claim 1, the CAM apparatus aids process design or work design by using tooth information of the end mill and material information of the workpiece.

11. A CAM apparatus for aiding the end mill machining apparatus according to claim 2, the CAM apparatus aids process design or work design by using tooth information of the end mill and material information of the workpiece.

12. A CAM apparatus for aiding the end mill machining apparatus according to claim 3, the CAM apparatus aids process design or work design by using tooth information of the end mill and material information of the workpiece.

13. An NC program for operating the end mill machining apparatus according to claim 1, the NC program wherein the NC program operates the end mill machining apparatus on the basis of tooth information of the end mill and material information of the workpiece.

14. An NC program for operating the end mill machining apparatus according to claim 2, the NC program wherein the NC program operates the end mill machining apparatus on the basis of tooth information of the end mill and material information of the workpiece.

15. An NC program for operating the end mill machining apparatus according to claim 3, the NC program wherein the NC program operates the end mill machining apparatus on the basis of tooth information of the end mill and material information of the workpiece.

16. A machining method for machining a workpiece by using an end mill, the machining method comprising:
using, as the end mill, an end mill of a variable pitch, uniform helix type or a variable helix type which is configured such that a ratio of a protrusion length of the end mill to a diameter of the end mill falls within a range of 5 to 50; and
machining the workpiece in a state in which a contact angle between the end mill and the workpiece during the machining is a critical contact angle $\theta_{lim}$ or smaller, the critical contact angle $\theta_{lim}$ is the angle when a solution satisfying the following equation does not appear even when the axial depth of cut a is increased to infinity, $$\det\left[[I] - \frac{1}{2}aK_t[A_0][G(i\omega_c)]\right] = 0$$

I: two-dimensional unit matrix
a: axial depth of cut
Kt: specific cutting force
$\omega_c$: chatter frequency
$A_0$: DC component of a cutting force coefficient matrix
$G(i\omega_c)$: transfer function at the chatter frequency.

17. A machining method according to claim 16, wherein the workpiece is machined by moving the end mill relative to the workpiece to depict a trochoid locus.

* * * * *